US012786926B2

(12) United States Patent
Kumar et al.

(10) Patent No.: US 12,786,926 B2
(45) Date of Patent: Nov. 3, 2026

(54) METHOD AND APPARATUS FOR MANAGING SOR SECURITY CHECK FAILURE DURING REGISTRATION PROCEDURE IN WIRELESS NETWORK

(71) Applicant: SAMSUNG ELECTRONICS CO., LTD., Suwon-si (KR)

(72) Inventors: Lalith Kumar, Bangalore (IN); Koustav Roy, Bangalore (IN); Arijit Sen, Bangalore (IN); Danish Ehsan Hashmi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 805 days.

(21) Appl. No.: 18/000,496

(22) PCT Filed: May 11, 2022

(86) PCT No.: PCT/KR2022/006742
§ 371 (c)(1),
(2) Date: Dec. 1, 2022

(87) PCT Pub. No.: WO2022/240189
PCT Pub. Date: Nov. 17, 2022

(65) Prior Publication Data

US 2024/0015682 A1 Jan. 11, 2024

(30) Foreign Application Priority Data

May 12, 2021 (IN) ............................ 202141021534
Apr. 26, 2022 (IN) ............................ 202141021534

(51) Int. Cl.
*H04W 4/00* (2018.01)
*H04W 8/12* (2009.01)
(Continued)

(52) U.S. Cl.
CPC ............ *H04W 60/04* (2013.01); *H04W 8/12* (2013.01); *H04W 60/06* (2013.01); *H04W 84/042* (2013.01)

(58) Field of Classification Search
CPC ....... H04W 60/04; H04W 8/12; H04W 60/06; H04W 84/042; H04W 12/06; H04W 8/02;
(Continued)

(56) References Cited

U.S. PATENT DOCUMENTS

2019/0182655 A1 6/2019 Gupta et al.
2020/0221281 A1 7/2020 Rajadurai et al.
(Continued)

FOREIGN PATENT DOCUMENTS

CN 110945886 A 3/2020
WO 2020096346 A1 5/2020

OTHER PUBLICATIONS

NTT DOCOMO—3GPP TSG-CT WG1, Meeting #129-e, C1-212051, Electronic meeting, Apr. 19-23, 2021 (Year: 2021).*
(Continued)

*Primary Examiner* — Edan Orgad
*Assistant Examiner* — Hidayat Dabiri

(57) ABSTRACT

A method for managing steering of roaming (SOR) security check failure during a registration procedure in a wireless network by a user equipment (UE) includes sending a registration request message to a network apparatus in the wireless network. Further, the method includes storing a registration type set by the UE while sending the registration request message to the network apparatus, wherein the registration type is one of a mobility registration updating and an initial registration. Further, the method includes receiving a registration accept message comprises a Steering of roaming connected mode control information (SOR-CMCI) configuration. Further, the method includes deter-
(Continued)

mining a SOR security check failure. Further, the method includes applying the SOR security check failure based on the stored registration type.

12 Claims, 4 Drawing Sheets

(51) Int. Cl.
*H04W 60/04* (2009.01)
*H04W 60/06* (2009.01)
*H04W 84/04* (2009.01)

(58) Field of Classification Search
CPC ..... H04W 48/18; H04W 76/18; H04W 76/27; H04W 76/32; H04W 76/50; H04W 12/10
See application file for complete search history.

(56) References Cited

U.S. PATENT DOCUMENTS

| | | | | |
|---|---|---|---|---|
| 2022/0264283 | A1* | 8/2022 | Won | H04W 8/205 |
| 2022/0312360 | A1* | 9/2022 | Kuppelur | H04W 60/04 |
| 2022/0394456 | A1* | 12/2022 | Liu | H04W 8/06 |
| 2022/0394652 | A1* | 12/2022 | Thakolsri | H04W 60/00 |
| 2024/0205687 | A1* | 6/2024 | Kumar | H04W 60/06 |

OTHER PUBLICATIONS

Intellectual Property India, "Examination report under sections 12 & 13 of the Patents Act" dated Dec. 23, 2022, in connection with Indian Patent Application No. 202141021534, 5 pages.

International Search Report and Written Opinion of the International Searching Authority dated Aug. 10, 2022, in connection with International Application No. PCT/KR2022/006742, 6 pages.

Apple et al., "Consider stored/configured SOR-CMCI information when processing REFRESH due to SOR", C1-212409(was C1-212248), 3GPP TSG-CT WG1 Meeting #129-e, Apr. 19-23, 2021, 12 pages.

NTT DOCOMO, "Resolve EN on the SOR-CMCI storage in the UE", C1-212200, 3GPP TSG-CT WG1 Meeting #129-e, Apr. 19-23, 2021, 24 pages.

Samsung, "ME support of SOR-CMCI indicator", C1-212204, 3GPP TSG-CT WG1 Meeting #129-e, Apr. 19-23, 2021, 9 pages.

3GPP TS 23.122 V17.2.0 (Mar. 2021) Technical Specification; 3rd Generation Partnership Project; Technical Specification Group Core Network and Terminals; Non-Access-Stratum (NAS) functions related to Mobile Station (MS) in idle mode (Release 17); 95 pages.

Supplementary European Search Report dated Sep. 25, 2023, in connection with European Patent Application No. 22807836.6, 14 pages.

Apple: "SOR check during mobility Registration", 3GPP TSG-CT WG1 Meeting #128-e, Electronic meeting, Feb. 25-Mar. 5, 2021, C1-210810, 11 pages.

NTT DOCOMO et al: "SOR-CMCI configuration and session handling for enhanced control plane SOR in connected mode", 3GPP TSG-CT WG1 Meeting #126-e, Electronic meeting, Oct. 2020, C1-207567, 12 pages.

NTT DOCOMO et al: "General correction and alignments for SOR", 3GPP TSG-CT WG1 Meeting #129-e, Electronic meeting Apr. 2021, C1-212051, 20 pages.

SHARP: "Handling of timer Tsor-cm when changing the network selection mode to manual mode", 3GPP TSG-CT WG1 Meeting #127bis-e, Electronic meeting, Jan. 2021, C1-210292, 8 pages.

* cited by examiner

[Fig. 1]
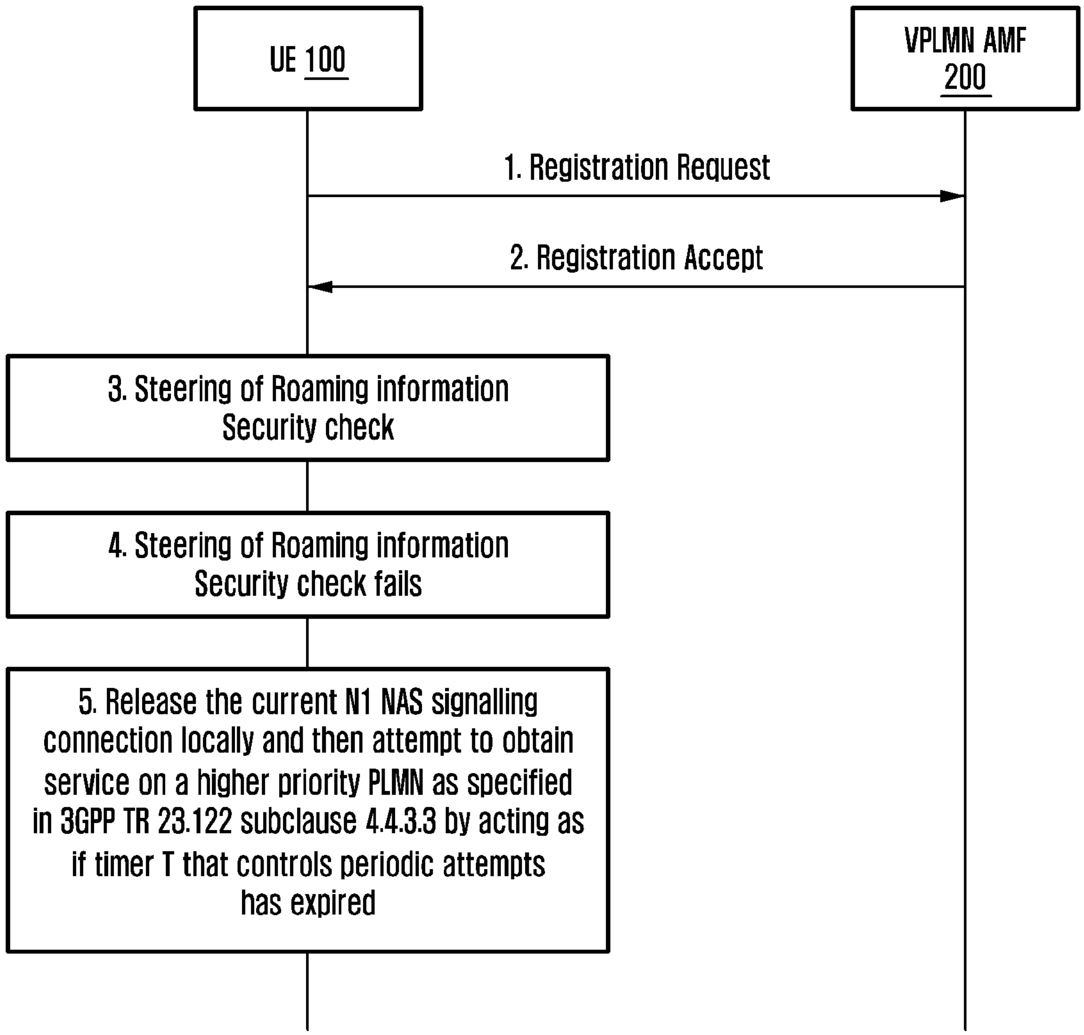
[Fig. 2]
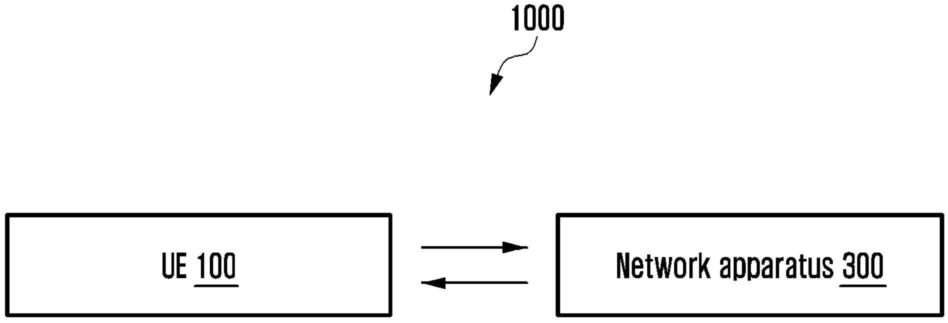

[Fig. 3]
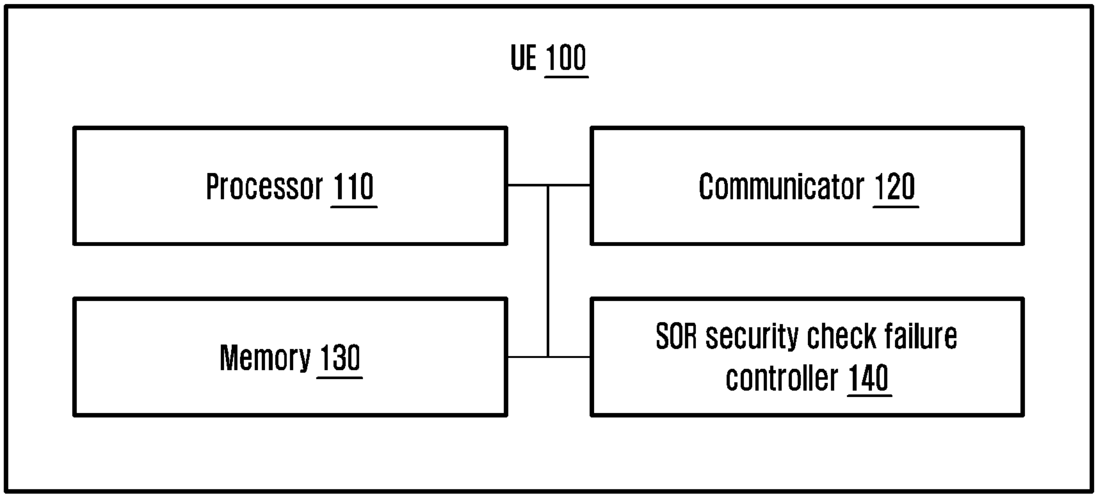

[Fig. 4a]
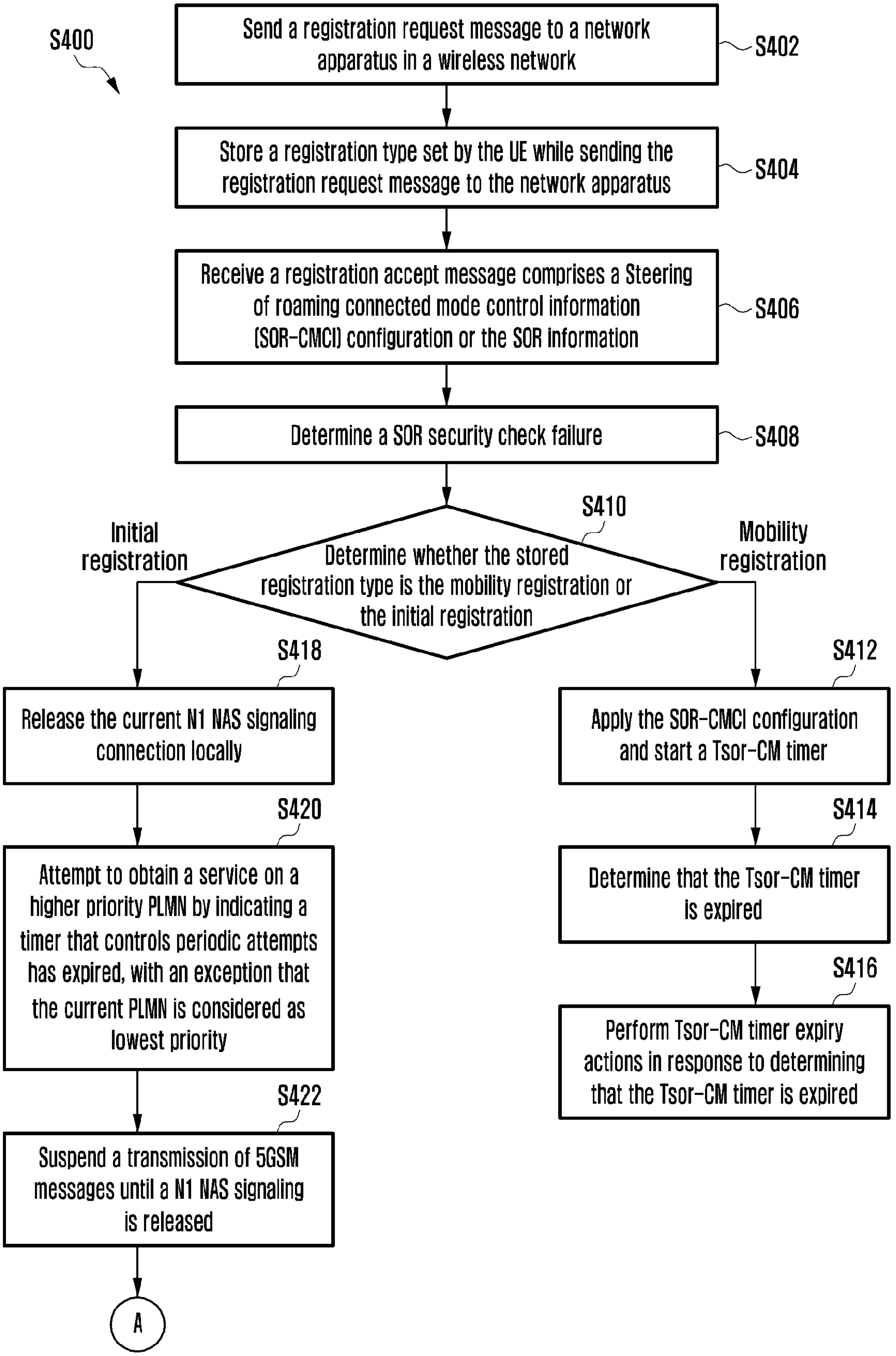

[Fig. 4b]
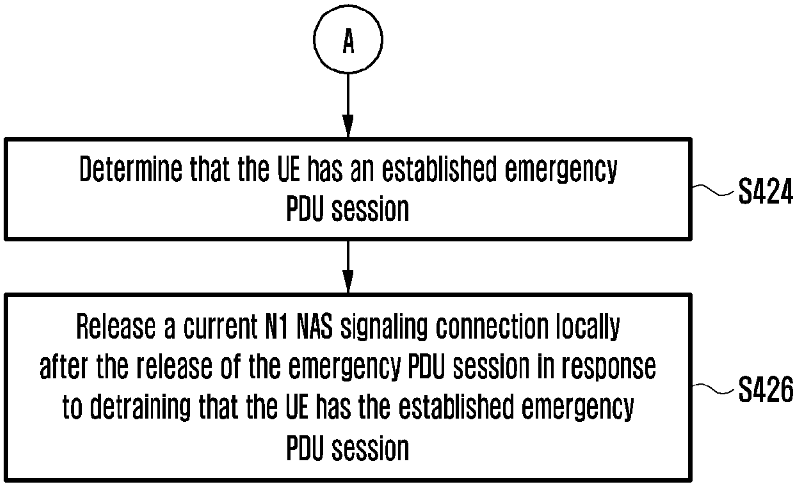

METHOD AND APPARATUS FOR MANAGING SOR SECURITY CHECK FAILURE DURING REGISTRATION PROCEDURE IN WIRELESS NETWORK

CROSS-REFERENCE TO RELATED APPLICATIONS

This application is a 371 of International Application No. PCT/KR2022/006742 filed on May 11, 2022, which claims priority to India Patent Application No. 202141021534 filed on May 12, 2021, and India Patent Application No. 202141021534 filed on Apr. 26, 2022, the disclosures of which are herein incorporated by reference in their entirety.

BACKGROUND

1. Field

The present disclosure relates to a wireless network, and more specifically related to a method and a User Equipment (UE) for managing a Steering of Roaming (SoR) security check failure during a registration procedure in the wireless network.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

FIG. 1 is a signalling diagram illustrating a SoR security check flow during a registration, according to the prior arts. In general, a Steering of Roaming (SoR) security check flow during a registration procedure having following steps:

Referring to the FIG. 1, at 1, the UE (100) sends the registration request message to the AMF (200). At 2, the AMF (200) sends the registration accept message to the UE (100). At 3, the UE (100) determines the steering of roaming (SOR) information security check. At 4, the UE (100)

determines the steering of roaming information security check is not successful (i.e. fails). At 5, the UE (100) releases the current N1 NAS signalling connection locally and then attempts to obtain service on a higher priority PLMN by acting as if the timer T that controls periodic attempts has expired. As per conventional methods when registration procedure is triggered there is no need to worry about the user services ongoing because UE is not even registered with the network. However prior art misses the cases that there are situations when UE may be running the services for example when handover procedure is executed etc. and still performs the registration procedure. Thus when UE triggers registration procedure, the SOR information is received in registration accept message, currently the UE (100) will locally release current N1 NAS Signalling connection, abort all the ongoing services and trigger PLMN selection procedure, due to which any critical service is ongoing then that is impacted for example URLLC services, Voice, SMS etc.

Thus, it is desired to address the above mentioned disadvantages or other shortcomings or at least provide a useful alternative.

SUMMARY

In line with development of the communication systems, there is a need for managing a Steering of Roaming (SoR) security check failure during a registration procedure in the wireless network. The principal object of the embodiments herein is to provide a method and UE for managing a SOR security check failure during a registration procedure in a wireless network.

Another object of the embodiments herein is to provide that the UE waits for services to complete, gracefully completes the services as per SOR-CMCI configuration and performs a PLMN selection when the registration type is the mobility registration.

Another object of the embodiments herein is to provide that the UE does not wait for a network to release and the UE aborts locally the signalling connection and performs PLMN selection, when the registration type is the initial registration.

Accordingly, the embodiment herein is to provide a method for managing SOR security check failure during a registration procedure in a wireless network. The method includes sending, by a UE in the wireless network, a registration request message to a network apparatus in the wireless network. Further, the method includes storing, by the UE, a registration type set by the UE while sending the registration request message to the network apparatus, wherein the registration type is one of a mobility registration updating and an initial registration. Further, the method includes receiving, by the UE, a registration accept message comprising a SOR-CMCI configuration or the SOR information. Further, the method includes determining, by the UE, a SOR security check failure. Further, the method includes applying, by the UE, a SOR security check failure based on the stored registration type and the stored SOR-CMCI configuration.

In an embodiment, applying, by the UE, a SOR security check failure based on the stored registration type and the stored SOR-CMCI configuration includes: determining, by the UE, whether the stored registration type is the mobility registration updating or the initial registration; applying the SOR security check failure for mobility registration procedure actions in response to determining the stored registration type is the mobility registration and the SOR-CMCI configuration is stored in the UE; and applying the SOR security check failure for initial registration procedure actions in response to determining the stored registration type is the initial registration or the SOR-CMCI configuration is not stored in the UE.

In an embodiment, applying the SOR security check failure for mobility registration procedure actions includes applying, by the UE, the SOR-CMCI configuration, starting, by the UE, a Tsor-CM timer, determining, by the UE, whether the Tsor-CM timer is expired, and performing, by the UE, Tsor-CM timer expiry actions in response to determining that the Tsor-CM timer is expired.

In an embodiment, the Tsor-Cm timer expiry actions comprises detecting, by the UE, that all the Tsor-Cm timer are expired or stopped, determining, by the UE, to perform a PLMN selection, determining, by the UE, that the UE is in the connected state, performing, by the UE, a Non-access stratum (NAS) procedure comprising deregistration procedure requesting release of all Protocol Data Unit (PDU) sessions and services, determining, by the UE, that the UE (100) enters in an IDLE mode, and attempting, by the UE, to obtain service on a higher priority PLMN by performing the PLMN selection procedure by considering a first VPLMN as lowest priority.

In an embodiment, the PLMN selection procedure is determined based on at least one of an ability of the UE to determine a higher priority PLMN than selected VPLMN in response to determining that a list of available and allowable PLMNs in an area is available at the UE, and an inability of the UE to determine a higher priority PLMN than selected VPLMN in response to determining that a list of available and allowable PLMNs in an area is not available at the UE.

In an embodiment, applying the SOR security check failure for initial registration procedure actions includes releasing, by the UE, the current N1 NAS signalling connection locally, attempting, by the UE, to obtain a service on a higher priority PLMN by indicating a timer T that controls periodic attempts has expired, with an exception that the current PLMN is considered as lowest priority, suspending, by the UE, a transmission of 5GSM messages until a N1 NAS signalling is released, determining, by the UE, whether the UE has an established emergency PDU session, and releasing, by the UE, a current N1 NAS signalling connection locally after the release of the emergency PDU session in response to determining that the UE has the established emergency PDU session.

Accordingly, the embodiment herein is to provide a UE for managing SOR security check failure during a registration procedure in a wireless network. The UE includes a SOR security check failure controller communicatively coupled to a memory and a processor. The SOR security check failure controller is configured to send a registration request message to a network apparatus in the wireless network. Further, the SOR security check failure controller is configured to store a registration type set by the UE while sending the registration request message to the network apparatus, wherein the registration type is one of a mobility registration updating and an initial registration. Further, the SOR security check failure controller is configured to receive a registration accept message comprises a Steering of roaming connected mode control information (SOR-CMCI) configuration or the SOR information. Further, the SOR security check failure controller is configured to determine that a SOR security check failure. Further, the SOR security check failure controller is configured to apply a SOR security check failure based on the stored registration type and the stored SOR-CMCI configuration.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

Advantages, and salient features of the invention will become apparent to those skilled in the art from the following detailed description, which taken in conjunction with the annexed drawings, discloses exemplary embodiments of the invention. Accordingly present invention, SoR security check failure can be performed efficiently.

BRIEF DESCRIPTION OF THE DRAWINGS

The embodiments are illustrated in the accompanying drawings, throughout which like reference letters indicate corresponding parts in the various figures. The embodiments herein will be better understood from the following description with reference to the drawings, in which:

FIG. 1 is a signalling diagram illustrating a SoR security check flow during registration, according to the prior arts;

FIG. 2 illustrates an overview of a wireless network for managing a SOR security check failure during a registration procedure, according to the embodiments as disclosed herein;

FIG. 3 shows various hardware components of a UE, according to embodiments as disclosed herein; and FIG. 4*a* is flow chart illustrating a method for managing the SOR security check failure during the registration procedure in the wireless network, according to embodiments as disclosed herein.

FIG. 4*b* is flow chart illustrating a method for managing the SOR security check failure during the registration procedure in the wireless network, according to embodiments as disclosed herein.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiment herein is to disclose a method for managing SOR security check failure during a registration procedure in a wireless network. The method includes sending, by a UE in the wireless network, a registration request message to a network apparatus in the wireless network. Further, the method includes storing, by the UE, a registration type set by the UE while sending the registration request message to the network apparatus, wherein the registration type is one of a mobility registration updating and an initial registration. Further, the method includes receiving, by the UE, a registration accept message comprises a Steering of roaming connected mode control information (SOR-CMCI) configuration or the SOR information. Further, the method includes determining, by the UE, a SOR security check failure. Further, the method includes applying, by the UE, a SOR security check failure based on the stored registration type and the stored SOR-CMCI configuration.

Referring now to the drawings and more particularly to FIGS. 2 through 4, where similar reference characters denote corresponding features consistently throughout the figures, there are shown preferred embodiments.

FIG. 2 illustrates an overview of a wireless network (1000) for managing a SOR security check failure during a registration procedure, according to the embodiments as disclosed herein. In an embodiment, the wireless network (1000) includes the UE (100) and a network apparatus (300). The wireless network (1000) can be, for example, but not limited to a 4G network, a 5G network, a 6G network, an ORAN network or the like. The UE (100) can be, for example, but not limited to a laptop, a desktop computer, a notebook, a relay device, a Device-to-Device (D2D) device, a vehicle to everything (V2X) device, a smartphone, a tablet, an immersive device, and an internet of things (IoT) device. The network apparatus (300) can be the AMF entity (200).

The UE (100) sends a registration request message to the network apparatus (300) in the wireless network (1000). While sending the registration request message to the network apparatus (300), the UE (100) stores a registration type set by the UE (100). The registration type can be a mobility registration updating or an initial registration. Further, the UE (100) receives a registration accept message comprising the SOR-CMCI configuration or the SOR information and determines the SOR security check failure. Further, the UE (100) applies the SOR security check failure based on the stored registration type and stored SOR_CMCI configuration.

In an embodiment, the UE (100) determines whether the stored registration type is the mobility registration updating or the initial registration. In response to determining the stored registration type is the mobility registration and the UE has stored SOR_CMCI configuration, the UE (100) applies the SOR security check failure for mobility registration procedure actions. In an embodiment, the SOR security check failure for the mobility registration procedure actions is applied by applying the SOR-CMCI configuration, starting a Tsor-CM timer, determining that the Tsor-CM timer is expired, and performing the Tsor-CM timer expiry actions in response to determining that the Tsor-CM timer is expired. The Tsor-Cm timer expiry actions includes detect that all the Tsor-Cm timer are expired or stopped, determine to perform a PLMN selection, determine that the UE (100) is in a connected state, perform a NAS procedure comprising deregistration procedure requesting release of all PDU sessions and services, determine that the UE (100) enters in an IDLE mode, and attempt to obtain service on a higher priority PLMN by performing the PLMN selection procedure by considering a first VPLMN as lowest priority.

The PLMN selection procedure is determined based on at least one of an ability of the UE (100) to determine a higher priority PLMN than selected VPLMN in response to determining that a list of available and allowable PLMNs in an area is available at the UE (100), and an inability of the UE (100) to determine a higher priority PLMN than selected VPLMN in response to determining that a list of available and allowable PLMNs in an area is not available at the UE (100).

In response to determining the stored registration type is the initial registration or the there is no stored SOR_CMCI configuration, the UE (100) applies the SOR security check failure for initial registration procedure actions. The SOR security check failure for the initial registration procedure actions is applied by releasing the current N1 NAS signalling connection locally, attempting to obtain a service on a higher priority PLMN by indicating a timer that controls periodic attempts has expired, with an exception that the current PLMN is considered as lowest priority, suspending, a transmission of 5GSM messages until a N1 NAS signalling is released, determining whether the UE (100) has an established emergency PDU session, and releasing a current N1 NAS signalling connection locally after the release of the emergency PDU session in response to detraining that the UE (100) has the established emergency PDU session.

FIG. 3 shows various hardware components of the UE (100), according to embodiments as disclosed herein. In an embodiment, the UE (100) includes a processor (110), a communicator (120), a memory (130), and a SOR security check failure controller (140). The processor (110) is coupled with the communicator (120), the memory (130) and the SOR security check failure controller (140).

The SOR security check failure controller (140) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The SOR security check failure controller (140) sends the registration request message to the network apparatus (300) in the wireless network (1000). While sending the registration request message to the network apparatus (300), the SOR security check failure controller (140) stores a registration type set by the UE (100). The registration type can be the mobility registration updating or the initial registration. Further, the SOR security check failure controller (140) receives the registration accept message comprises the SOR-CMCI configuration or the SOR information and determines the SOR security check failure. Further, the SOR security check failure controller (140) applies the SOR security check failure based on the stored registration type and stored SOR_CMCI configuration.

In an embodiment, the SOR security check failure controller (140) determines whether the stored registration type is the mobility registration updating or the initial registration. In response to determining the stored registration type is the mobility registration and the UE has a stored SOR_CMCI configuration, the SOR security check failure controller (140) applies the SOR security check failure for mobility registration procedure actions. In response to determining the stored registration type is the initial registration or SOR_CMCI configuration is not stored, the SOR security check failure controller (140) applies the SOR security check failure for initial registration procedure actions.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Although the FIG. 3 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the invention. One or more components can be combined together to perform same or substantially similar function in the UE (100).

FIG. 4*a* and FIG. 4*b* are flow charts (S400) illustrating a method for managing the SOR security check failure during the registration procedure in the wireless network (1000), according to embodiments as disclosed herein. The operations (S402-S426) are handled by the SOR security check failure controller (140).

At S402, the method includes sending the registration request message to the network apparatus (300) in the wireless network (1000). At S404, the method includes storing the registration type set by the UE (100) while sending the registration request message to the network apparatus (300). At S406, the method includes receiving the registration accept message comprising the SOR-CMCI configuration or the SOR information. At S408, the method includes determining the SOR security check failure based on the stored registration type and the stored SOR-CMCI configuration. At S410, the method includes determining whether the stored registration type is the mobility registration updating or the initial registration.

In response to the stored registration type is the mobility registration updating and there is stored SOR-CMCI configuration then, at S412, the method includes applying the SOR-CMCI configuration and starting the Tsor-CM timer. In response to determining the stored registration type is the mobility registration updating and the SOR-CMCI configuration is stored in the UE, the method includes applying the SOR security check failure for mobility registration procedure actions as indicates from S414-S416.

At S414, the method includes determining that all the Tsor-CM timer(s) are expired or stopped. At S416, the method includes performing the Tsor-CM timer expiry actions in response to determining that the Tsor-CM timer is expired.

In response to the stored registration type is the initial registration or the SOR-CMCI configuration is not stored in the UE, the method includes applying the SOR security check failure for initial registration procedure actions as indicated from S418-S426. At S418, the method includes releasing the current N1 NAS signaling connection locally. At S420, the method includes attempting to obtain the service on a higher priority PLMN by acting as it the timer that controls periodic attempts has expired, with an exception that the current PLMN is considered as lowest priority. At S422, the method includes suspending the transmission of 5GSM messages until the N1 NAS signaling is released. At S424, the method includes determining that the UE (100) has an established emergency PDU session. At S426, the method includes releasing the current N1 NAS signaling connection locally after the release of the emergency PDU session in response to determining that the UE (100) has the established emergency PDU session.

Unlike to the conventional methods and systems, as per the proposed method, once SoR security check is not successful (i.e. fails) over the received SOR information or SOR-CMCI information in the NAS message, the UE (100) shall wait until it moves to idle mode or 5GMM-CONNECTED mode with Radio Resource Control (RRC) inactive indication before attempting to obtain service on a higher priority PLMN by acting as if timer T that controls periodic attempts has expired if there are ongoing PDU sessions or services in the UE. In addition, the UE (100) may also check during registration procedure or DL NAS transport procedure or any NAS procedure in which UE may receive SOR information or the SOR_CMCI information and security check is not successful, if any voice or emergency or video call is ongoing or any data session is ongoing. If there are no ongoing PDU sessions or service ongoing, the UE (100) may locally release current N1 NAS Signalling and then attempt to obtain service on a higher priority PLMN by acting as if timer T that controls periodic attempt has expired.

Further, the method consists of following steps:

1. The UE (100) is having ongoing session i.e. PDU sessions or services for example voice call or SMS etc.

2. The UE (100) triggers a registration procedure for mobility and periodic registration update or the initial registration procedure.

3. The UE (100) receives a registration accept message.

4. The UE (100) performs a security check on the stored SOR information.

5. If the security check is not successful:

a. The UE (100) checks the 5GS registration type it has set in the registration request message in response to which registration accept message is received.

b. If 5GS registration type is set to initial registration the UE (100):

i. If the current chosen VPLMN is not contained in the list of “PLMNs where registration was aborted due to SOR”, and is not part of “User Controlled PLMN Selector with Access Technology” list and the UE (100) is not in manual mode of operation, release the current N1 NAS signalling connection locally and attempt to obtain service on a higher priority PLMN by acting as if timer T that controls periodic attempts has expired, with an exception that the current PLMN is considered as lowest priority. The UE (100) shall suspend the transmission of 5GSM messages until the N1 NAS signalling is released. If the UE (100) has an established emergency PDU session, the UE (100) shall release the current N1 NAS signalling connection locally after the release of the emergency PDU session. If the UE (100) needs to disable the N1 mode capability and there is no emergency service pending, the UE (100) shall first attempt to obtain service on a higher priority PLMN as described in this step, and if no higher priority PLMN can be selected but the last registered PLMN is selected, then the UE (100) shall disable the N1 mode capability; and store the PLMN identity in the list of “PLMNs where registration was aborted due to SOR”.

ii. Otherwise, for e.g. if 5GS registration type is set to mobility registration updating or periodic registration updating. The UE (100) shall wait until it moves to idle mode or 5GMM-CONNECTED mode with RRC inactive indication before attempting to obtain service on a higher priority PLMN as specified in TS23.122 subclause 4.4.3.3 by acting as if timer T that controls periodic attempts has expired, optionally if the UE (100) is not configured with Steering of roaming connected mode control information (SOR-CMCI). If the UE (100) is configured with SOR-CMCI, the UE (100) shall take into account the SOR-CMCI configuration before moving to IDLE mode. I.e. the UE (100) should start the respective Tsor-CM timers based on the SOR-CMCI configuration. At the expiry of these timers the UE (100) shall attempt to move to IDLE state as defined below when Tsor-CM timer expires or stopped.

When the last running Tsor-cm timer stops or expires not due to the UE (100) entering idle mode or 5GMM-CONNECTED mode with RRC inactive indication, if:

1. The UE (100) has a list of available and allowable PLMNs in the area and based on this list or any other implementation specific means, the UE (100) determines that there is a higher priority PLMN than the selected VPLMN; or 2. The UE (100) does not have a list of available and allowable PLMNs in the area and is unable to determine whether there is a higher priority PLMN than the selected VPLMN using any other implementation specific means:

3. Then the UE (100) shall perform the deregistration procedure that releases all the established PDU sessions and the UE (100) enters idle mode and attempts to obtain service on a higher priority PLMN as specified in TS 23.122 by acting as if timer T that controls periodic attempts has expired.

Steering of roaming connected mode control information (SOR-CMCI): HPLMN information to control the timing for the UE (100) in the connected mode to move to the idle mode in order to perform steering of roaming.

The Home Public Land Mobile Network (HPLMN), based on operator policy, may provide the UE (100) with SOR-CMCI to control the timing when the UE (100) enters the idle mode and perform the higher priority PLMN/access technology selection. This is achieved by the HPLMN indicating to the UE (100) the criteria for releasing specific PDU session(s) or services to enter idle mode. The HPLMN may configure the SOR-CMCI in the UE (100), and may also provide the SOR-CMCI to the UE (100) over N1 NAS signalling. The SOR-CMCI received over N1 NAS signalling takes precedence over the SOR-CMCI configured in the UE (100).

The security check is not successful (i.e. fails) if the UE's USIM is configured with indication that the UE (100) is to receive the steering of roaming information (SoR) due to initial registration in a VPLMN, but neither the list of preferred PLMN/access technology combinations nor the secured packet nor the HPLMN indication that 'no change of the "Operator Controlled PLMN Selector with Access Technology" list stored in the UE (100) is needed and thus no list of preferred PLMN/access technology combinations is provided' is received in the REGISTRATION ACCEPT message, when the UE (100) performs the initial registration in the VPLMN or if the steering of roaming information is received but the security check is not successful (i.e. if integrity check on the stored SOR information is not successful as defined in the TS 24.501).

There are two types of registration procedures as follows:

a) Registration procedure for initial registration; and

When the UE initiates the registration procedure for initial registration, the UE shall indicate "initial registration" in the 5GS registration type IE. When the UE initiates the registration procedure for emergency services, the UE shall indicate "emergency registration" in the 5GS registration type IE. When the UE initiates the initial registration for onboarding services in SNPN, the UE shall indicate "SNPN onboarding registration" in the 5GS registration type IE. When the UE initiates the initial registration procedure for disaster roaming services, the UE shall indicate "disaster roaming initial registration" in the 5GS registration type IE b) Registration procedure for mobility and periodic registration update When the UE initiates the registration procedure for mobility and periodic registration update for disaster roaming services, the UE shall indicate "disaster roaming mobility registration updating" in the 5GS registration type IE.

When the UE initiates the registration procedure for mobility and periodic registration update for periodic updating, the UE shall indicate "periodic registration updating" in the 5GS registration type IE otherwise the UE shall indicate "mobility registration updating".

The aim of the solution discussed in the embodiments is for the UE to determine type of the registration procedure whether it is Registration procedure for initial registration or Registration procedure for mobility and periodic registration update. UE identifies the respective registration procedure using the 5GS registration type IE it had set in the registration request message. Based on the identified type of registration procedure the respective security check failure actions are performed.

Thus, in the embodiments 5GS registration type IE set to "initial registration" or "emergency registration" or "SNPN onboarding registration" or "disaster roaming initial registration" they all represent Registration procedure for initial registration, all have same meaning w.r.t to this embodiment and the security check failure actions are same i.e. SOR security check failure for initial registration procedure actions as described in this embodiment.

Similarly in this embodiment, 5GS registration type IE set to "disaster roaming mobility registration updating" or "periodic registration updating" or "mobility registration updating" they all represent the Registration procedure for mobility and periodic registration update, all have same meaning w.r.t to this embodiment and the security check failure actions are same i.e. SOR security check failure for mobility registration procedure actions as described in this embodiment.

The various actions, acts, blocks, steps, or the like in the flow charts (S400 and S500) may be performed in the order presented, in a different order or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by a User Equipment (UE) in a communication system supporting a steering of roaming (SOR), the method comprising:

transmitting, to a network entity, a registration request message including information on a registration type;

receiving, from the network entity, a registration accept message;

in response to the information on the registration type being for a mobility registration, identifying whether a security check of SOR information included in the registration accept message is successful; and in response to the security check of the SOR information not being successful, applying stored SOR connected mode control information (SOR-CMCI).

2. The method of claim 1, wherein applying the SOR-CMCI further comprises:

starting a Tsor-CM timer based on the SOR-CMCI;

identifying whether a last Tsor-CM timer is expired; and in response to the last Tsor-CM timer expiring, performing a public land mobile network (PLMN) selection procedure.

3. The method of claim 2, wherein performing the PLMN selection procedure comprises:

in response to the UE having a list of available and allowable PLMNs in an area, determining that there is a higher priority PLMN than a selected visited PLMN (VPLMN) based on the list of available and allowable PLMNs or any other implementation specific means.

4. The method of claim 2, further comprising:

identifying whether the UE is in a connected mode;

in response to the UE being in the connected mode, performing a de- registration procedure releasing all established protocol data unit (PDU) sessions and services;

identifying whether the UE enters an idle mode; and in response to the UE entering the idle mode, attempting to obtain a service on a higher priority PLMN.

5. The method of claim 1, further comprising:

in response to the information on the registration type being for an initial registration, identifying whether neither a list of preferred public land mobile network (PLMN) and access technology combinations, nor a secured packet, nor a home PLMN (HPLMN) indication indicating that no change of an operator controlled PLMN selector with access technology list stored in the UE is needed and thus no list of preferred PLMN and access technology combination is provided in the registration accept message; and in response to neither the list of preferred PLMN and access technology combinations, nor the secured packet, nor the HPLMN indication indicating that no change of the operator controlled PLMN selector with access technology list stored in the UE is needed and thus no list of preferred PLMN and access technology combination is provided in the registration accept message, releasing an N1 non access stratum (NAS) signaling connection.

6. The method of claim 5, further comprising:

attempting to obtain a service on a higher priority PLMN as if a timer that controls periodic attempts has expired, with an exception that a current PLMN is considered as a lowest priority.

7. The method of claim 5, further comprising:

in response to the UE having an established emergency protocol data unit (PDU) session, releasing a current N1 NAS signaling connection locally after a release of the emergency PDU session.

8. A User Equipment (UE) in a communication system supporting a steering of roaming (SOR), the UE comprising:

a transceiver capable of transmitting and receiving at least one signal; and a controller coupled to the transceiver, wherein the controller is configured to transmit, to a network entity, a registration request message including information on a registration type, receive, from the network entity, a registration accept message, in response to the information on the registration type being for a mobility registration, identify whether a security check of SOR information includes included in the registration accept message is successful, and in response to the security check of the SOR information not being successful, apply stored SOR connected mode control information (SOR-CMCI).

9. The UE of claim 8, wherein the controller is further configured to:

start a Tsor-CM timer based on the SOR-CMCI, identify whether a last Tsor-CM timer is expired, and in response to the last Tsor-CM timer expiring, perform a public land mobile network (PLMN) selection procedure, wherein performing the PLMN selection procedure comprises in response to the UE having a list of available and allowable PLMNs in an area, determining that there is a higher priority PLMN than a selected visited PLMN (VPLMN) based on the list of available and allowable PLMNs or any other implementation specific means, and wherein the controller is further configured to identify whether the UE is in a connected mode, perform a de-registration procedure releasing all established protocol data unit (PDU) sessions and services in response to the UE being in the connected mode, identify whether the UE enters an idle mode, and attempt to obtain a service on the higher priority PLMN in response to the UE entering the idle mode.

10. The UE of claim 8, wherein the controller is further configured to:

in response to the information on the registration type being for an initial registration, identify whether neither a list of preferred public land mobile network (PLMN) and access technology combinations, nor a secured packet, nor a home PLMN (HPLMN) indication indicating that no change of an operator controlled PLMN selector with access technology list stored in the UE is needed and thus no list of preferred PLMN and access technology combination is provided in the registration accept message; and in response to neither the list of preferred PLMN and access technology combinations, nor the secured packet, nor the HPLMN indication indicating that no change of the operator controlled PLMN selector with access technology list stored in the UE is needed and thus no list of preferred PLMN and access technology combination is provided in the registration accept message, release an N1 non access stratum (NAS) signaling connection.

11. The UE of claim 10, wherein the controller is further configured to:

attempt to obtain a service on a higher priority PLMN as if a timer that controls periodic attempts has expired, with an exception that a current PLMN is considered as a lowest priority.

12. The UE of claim 10, wherein the controller is further configured to:

in response to the UE having an established emergency protocol data unit (PDU) session, release a current N1 NAS signaling connection locally after a release of the emergency PDU session.

* * * * *